(12) United States Patent
Dabbagh et al.

(10) Patent No.: US 10,084,658 B2
(45) Date of Patent: Sep. 25, 2018

(54) ENHANCED CLOUD DEMAND PREDICTION FOR SMART DATA CENTERS

(71) Applicant: Cisco Technology, Inc., San Jose, CA (US)

(72) Inventors: Mehiar Dabbagh, Corvallis, OR (US); Ammar Rayes, San Ramon, CA (US)

(73) Assignee: Cisco Technology, Inc., San Jose, CA (US)

( * ) Notice: Subject to any disclaimer, the term of this patent is extended or adjusted under 35 U.S.C. 154(b) by 272 days.

(21) Appl. No.: 14/868,224

(22) Filed: Sep. 28, 2015

(65) Prior Publication Data

US 2017/0093639 A1 Mar. 30, 2017

(51) Int. Cl.
*H04L 12/24* (2006.01)
*H04L 12/26* (2006.01)
*H04L 29/08* (2006.01)

(52) U.S. Cl.
CPC .............. *H04L 41/12* (2013.01); *H04L 43/08* (2013.01); *H04L 67/10* (2013.01)

(58) Field of Classification Search
CPC .......... H04L 41/12; H04L 43/08; H04L 67/10
See application file for complete search history.

(56) References Cited

U.S. PATENT DOCUMENTS

| | | | | |
|---|---|---|---|---|
| 5,815,662 A * | 9/1998 | Ong | .................... | H04N 7/17336 348/E7.073 |
| 8,499,086 B2 * | 7/2013 | Koning | .................... | G06F 9/505 709/219 |
| 2002/0078028 A1 * | 6/2002 | Lisanke | ................ | G06F 9/5027 |
| 2010/0198609 A1 * | 8/2010 | Mellin | ................... | G06Q 10/06 705/2 |
| 2012/0151490 A1 * | 6/2012 | Zhang | ................... | G06F 9/5094 718/102 |
| 2012/0191929 A1 * | 7/2012 | Zietzke | ............... | G06F 9/45533 711/162 |
| 2012/0311586 A1 * | 12/2012 | Inagaki | ................. | G06F 9/4881 718/100 |
| 2013/0081093 A1 * | 3/2013 | Cassidy | .................. | G06F 9/505 725/82 |
| 2014/0282626 A1 * | 9/2014 | Muguda | .................... | G06F 9/54 719/328 |
| 2014/0325072 A1 * | 10/2014 | Zhang | ................... | H04L 47/823 709/226 |
| 2014/0372606 A1 * | 12/2014 | Della Corte | ........ | H04L 41/5096 709/224 |

(Continued)

*Primary Examiner* — Uzma Alam
(74) *Attorney, Agent, or Firm* — Patterson + Sheridan, LLP

(57) ABSTRACT

Techniques are provided for predictively activating physical servers. Embodiments determine a plurality of physical servers that are available within one or more data centers. A plurality of virtual workload deployment requests that were processed within the one or more data centers during a historical window of time is determined. Embodiments classify each of the plurality of virtual workload deployment requests into one of a plurality of categories. A respective neural network prediction model is generated for each of the plurality of categories, based on the virtual workload deployment requests classified into the respective category. Embodiments then determine a number of physical servers to have active at a future moment in time, using the generated neural network prediction models.

19 Claims, 6 Drawing Sheets

(56) References Cited

U.S. PATENT DOCUMENTS

| | | | | |
|---|---|---|---|---|
| 2015/0006440 A1* | 1/2015 | Nicholson | ................ | G06N 5/04 |
| | | | | 706/11 |
| 2015/0081374 A1* | 3/2015 | Sahlstrom | ........ | G06Q 10/06315 |
| | | | | 705/7.25 |
| 2015/0286684 A1* | 10/2015 | Heinz | ................ | G06F 11/3476 |
| | | | | 707/769 |
| 2016/0234071 A1* | 8/2016 | Nambiar | ................ | H04L 43/08 |
| 2016/0363976 A1* | 12/2016 | Gatson | ...................... | G06F 1/26 |

* cited by examiner

ENHANCED CLOUD DEMAND PREDICTION FOR SMART DATA CENTERS

TECHNICAL FIELD

Embodiments presented in this disclosure generally relate to providing access to computing resources, and more particularly, to predicting an optimal number of active physical servers needed to meet future demand using neural network predictors.

BACKGROUND

Cloud computing has become a popular approach for obtaining access to (sometimes large-scale) computing resources. Cloud computing allows users to build virtualized data centers which include compute, networking, application, and storage resources without having to build or maintain a physical computing infrastructure. The virtualized data center may provide a user with a segmented virtual network located in the cloud, typically alongside virtualized data centers of other users. Such a virtualized data center may be rapidly scaled up (or down) according to the computing needs of a given user without the need to maintain excess computing capacity between peak demand periods. For example, an online retailer can scale a virtualized data center to meet increased demand during the holiday shopping season without having to maintain the underlying physical computing infrastructure used to provide the retailer's online presence.

Often times, a cloud-computing environment is created using multiple data centers, with each data center providing various computing resources to the cloud. Such data centers are frequently located in different geographical locations. Furthermore, the resources that each data center provides to the cloud may differ. For example, a first data center may provide higher performance computing resources than a second data center, or may provide fast network access to particular computing resources that are not provided at all by the second data center. Additionally, the workloads of the computing resources provided by each of the data centers may differ as well. For instance, while the computing resources of the first data center may be operating at 90% capacity, the computing resources of the second data center may only be operating at 20% capacity.

When deploying virtual workloads within a data center, conventional systems may include logic to select a physical server that is suitable for the deployment of the virtual workload. For example, conventional systems may consider a physical server's computing resources and computing resource usage. In many instances, the supply of physical servers in a data center may exceed the demand for deploying virtual workloads. However, idle physical servers in the data center still consume substantial amounts of power. While these idle physical servers can be placed in a sleep state, doing so only reduces the amount of power consumed by the physical servers. Moreover, although the physical servers can be powered off when they are idle, doing so increases the amount of time that is required to deploy a virtual workload to the physical server when the demand for deploying virtual workloads once again increases.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DESCRIPTION OF EXAMPLE EMBODIMENTS

Overview

Figure 1:
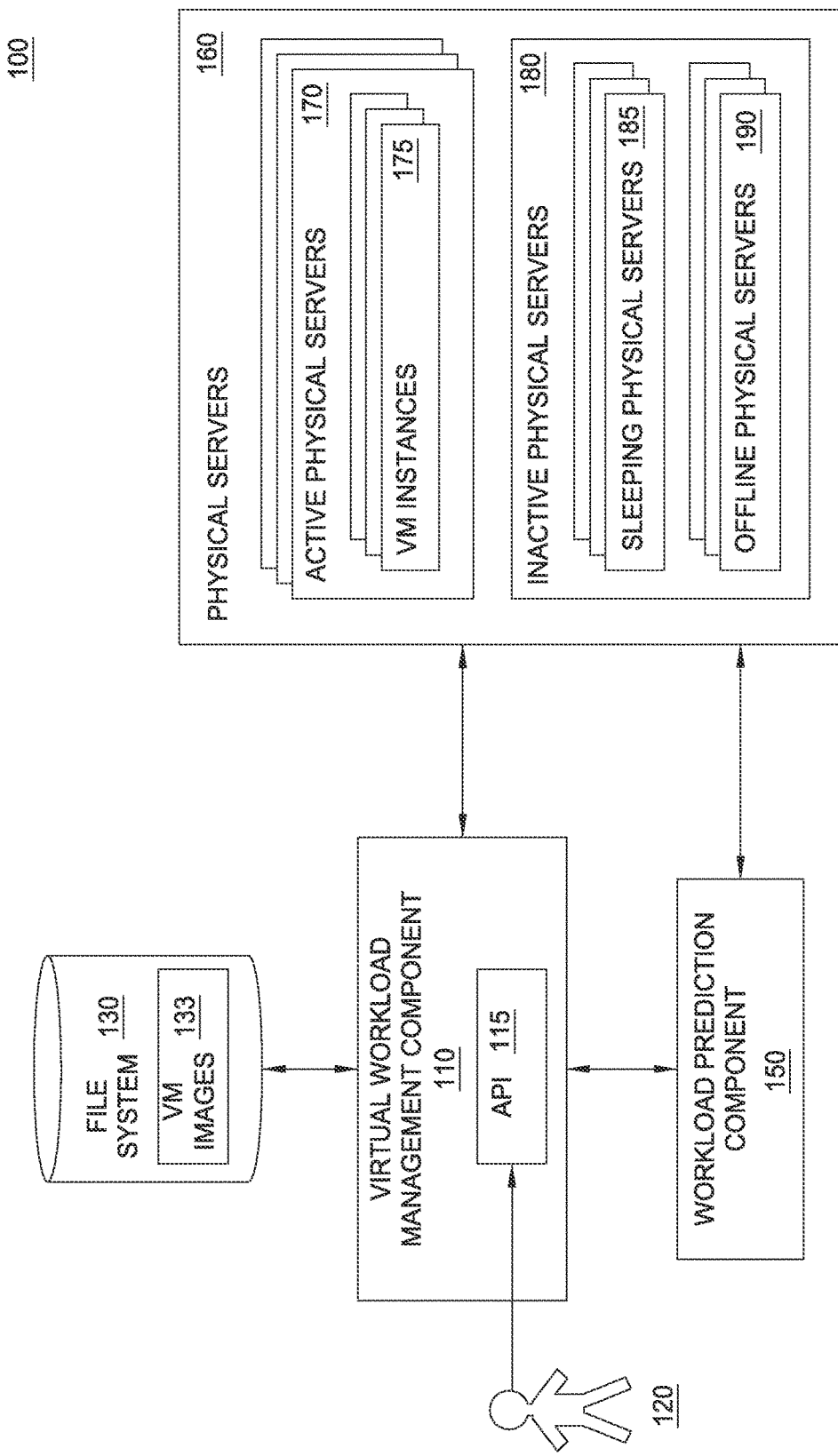
FIG. 1 is a block diagram illustrating a system containing a workload prediction component, according to one embodiment described herein.

One embodiment presented in this disclosure provides a method for predicting future demand for physical servers within one or more data centers. The method includes determining a plurality of physical servers that are available within the one or more data centers. The method also includes determining a plurality of virtual workload deployment requests that were processed within the one or more data centers during a historical window of time. Additionally, the method includes classifying each of the plurality of virtual workload deployment requests into one of a plurality of categories. The method further includes generating, for each of the plurality of categories, a respective neural network prediction model, based on the virtual workload deployment requests classified into the respective category. Moreover, the method includes determining a number of physical servers to have active at a future moment in time, using the generated neural network prediction models.

Additional embodiments provide a system and a non-transitory computer-readable medium configured with computer program code that, when executed, performs the aforementioned method.

Example Embodiments

The popularity of server virtualization, from virtual machines to containers to storage, has resulted in a rapid rise in cloud-based data centers. In a data center, virtual machines and other virtual workloads (which can include one or more virtual machines (VMs)) are deployed by the compute and storage orchestrators based on various heuristics. Typically, these heuristics include server resources such as vCPU, memory, network bandwidth, etc. Other heuristics include deploying a virtual machine based on application affinity, selection of compute node closer to a storage bank, etc. The eventual goal is to deploy applications made up of virtual machines interconnected in different tiers with appropriate security policies determining the interaction between the tiers. The physical servers on which the virtual workloads can be deployed are typically arranged in racks each equipped with a pair of Top-of-Rack (ToR) switch. The ToRs themselves may be interconnected by a layer of spine switches realizing a CLOS topology.

Generally, a cloud client can submit a virtual workload deployment request to the cloud computing environment at any time. Such a virtual workload deployment request can generally specify an amount of computing resources (e.g., CPU, memory, etc.) that is needed to deploy the specified request. That is, generally, such a request can specify the computing resources that the client needs in order to perform a certain job. Upon reception of the request, a cluster manager for the cloud computing environment can assign the request to one or more servers within the cloud computing environment and allocates the requested resources. Generally, the computing resources of each physical server are virtualized, which allows multiple virtual machine requests to potentially be assigned to the same physical server, provided the physical server has sufficient resource capacity to satisfy the resource requirements of the various hosted virtual machines.

Additionally, the cluster manager can perform periodic power management decisions where the cluster manager decides which server to keep online (also referred to herein as "active") and which servers to make inactive (e.g., a sleep state, an offline state, etc.). As active physical servers consume a substantial amount of power and thus incur a substantial cost, determining which servers to keep active within the cloud computing environment is a very important management issue. As such, overestimating the number of physical servers that are needed to fulfill client demand results in needless power consumption and excessive costs for the cloud computing environment, as even idle servers can consume roughly 50% of the server's power consumption when operating at peak performance. At the same time, underestimating the number of physical servers to keep online can be very problematic, as this can cause clients to witness delays while sleeping (or otherwise inactive) servers are switched to an active state, in addition to other delays due to needed setup times, before the clients' requests can be fulfilled.

As such, embodiments provide techniques for predicting future workloads for clustered computing environments (e.g., cloud computing environments). Embodiments include determining a plurality of physical servers that are available within one or more data centers. Embodiments additionally determining a plurality of virtual workload deployment requests that were processed within the one or more data centers during a historical window of time. As will be discussed below, embodiments can determine the historical window of time based on power consumption attributes of physical servers within the one or more data centers (e.g., an amount of power required to shutdown and restart a physical server).

Additionally, embodiments can classify each of the plurality of virtual workload deployment requests into one of a plurality of categories. As will be discussed in more detail below, embodiments can determine the attributes of the categories and an optimal number of categories to use, based on the determined plurality of virtual workload deployment requests. Embodiments can generate, for each of the plurality of categories, a respective prediction model, based on the virtual workload deployment requests classified into the respective category. Generally, each prediction model is configured to predict a number of virtual workload deployment requests that will be received for the respective category at a future moment in time. Embodiments then determine a number of physical servers to have active at a future moment in time, using the generated prediction models. For example, embodiments could determine a number of predicted virtual workload deployment requests for each of the prediction models, and could then determine a total number of physical servers that would be needed to fulfill the aggregate number of predicted virtual workload deployment requests (e.g., assuming the virtual workload deployment requests are assigned to physical servers in an optimal fashion). Doing so provides an optimal way of predicting a number of active physical servers that will be needed at a future moment in time, thereby minimizing the power costs of the data center(s) and minimizing the delay in deploying client requests.

Generally, embodiments described herein may pertain to clouds of computing resources which are hosted using a plurality of multi-tenant data centers. As defined herein, the term "computing resources" generally refers to any computer-related resources, examples of which include, without limitation, processing resources, storage resources, network resources and software resources. A "data center" may be any location which hosts cloud services and which provides computing resources to the cloud. More generally, however, a data center may be any environment in which virtual workloads are deployed onto physical servers. Embodiments described herein provide techniques for predicting an optimal number of physical servers to have online within a data center (e.g., of a cloud computing environment) at a future moment of time in order to satisfy a predicted client demand for deploying virtual workloads. Such a virtual workload may include one or more virtual machines, as well as additional services such as load balancing, firewall, multi-VLANs (sub-container's), and MPLS VPN services, delivered to users as a complete end-to-end service.

Embodiments described herein may be provided to end users through a cloud-computing infrastructure. Cloud computing generally refers to the provision of segmented hardware and software resources as a service delivered over a network. More formally, cloud computing may provide an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud-computing resources are provided to a user on a pay-per-use basis, where users are charged only for the computing resources actually used (e.g., an amount of storage space consumed by a user or a number of virtualized systems instantiated by the user). A user can typically access any of the resources that reside in the cloud at any time, and from anywhere across the Internet. In context of the present disclosure, users may submit a request to a cloud service for a virtual workload to be deployed. As described in greater detail below, a workload management system may select a physical server(s) within a data center on which to deploy the virtual workload, based on a network state of network resources relating to the physical server(s) and located within a switch fabric. The workload management system may then transmit the received virtual workload to the physical server(s) for deployment.

FIG. 1 is a block diagram illustrating a system containing a workload prediction component, according to one embodiment described herein. As shown, the system 100 includes a file system 130 connected to a virtual workload management component 110. The virtual workload management component 110, in turn, is connected to a workload prediction component 150 and a number of physical servers 160. Additionally, the virtual workload management component 110 contains an application program interface (API) through which client applications 120 can submit requests to deploy virtual workloads within the computing environment. The physical servers 160 include a plurality of active physical servers 170 and a plurality of inactive physical servers 180. As shown, at least some of the active physical servers 170 include one or more VM instances 175. That is, in the depicted example, virtual workloads have been deployed by the virtual workload management component 110 to at least some of the active physical servers 170.

The inactive physical servers 180 include sleeping physical servers 185 and offline physical servers 190. Generally, the sleeping physical servers 185 represent physical servers that have been set into a power conservation mode (also referred to as a sleep mode), while the offline physical servers 190 represent physical servers which have been powered down. As a general matter, the sleeping physical servers 185 can be brought online more quickly than the offline physical servers 190, as the sleeping physical servers 185 do not require a full boot cycle in order to come online. On the other hand, the sleeping physical servers 185 generally require more power to operate, as at least some system state data is preserved for the sleeping physical servers 185.

As a general matter, the virtual workload management component 110 is configured to receive virtual workload requests from clients 120 and to deploy the virtual workload requests onto one or more of the physical servers 170. Generally, the virtual workload management component 110 can select an active physical server 170 which has available computing resources that are sufficient to satisfy the requirements of a VM image being deployed. In some instances, beyond considering the resources of the active physical servers 170, the virtual workload management component 110 can access the network state data for a data center network (not shown) for use in selecting an optimal or suitable active physical server 170 onto which to deploy the VM image. In one embodiment, the system 100 includes a network controller (not shown), e.g., the Cisco® Prime Data Center Network Manager application.

Generally, each virtual workload request can specify one or more of the VM images 135 within the file system 130 to deploy onto an active physical server(s) 170. The virtual workload management component 110 could then select an active physical server 170 that is determined to be suitable for the deployment of the VM image 135, e.g., based on computing resources of the active physical servers 170, resource requirements specified in the request, and network state data for a data network of the system 100. That is, the virtual workload management component 110 may consider the physical computing resources of the active physical servers 170 as well as the current workload of the active physical servers 170 to select an optimal server that is capable of meeting the requirements of the virtual workload request.

While the virtual workload management component 110 is generally tasked with intelligently selecting a physical server on which to deploy new virtual workloads (e.g., virtual machine images, containers such as Linux® containers, etc.), the workload prediction component 150 is generally tasked with determining a number of active physical servers 170 that will be needed a future moment in time. That is, if the system 100 does not have enough active physical servers 170 to meet the client demand for virtual workload deployments, the clients 120 may encounter slower deployment times for new virtual workloads, e.g., as a sleeping physical server 185 is brought out of its sleep state or as an offline physical server 190 is booted. On the other hand, if there is an excess of active physical servers 170, the system 100 may express excess (i.e., wasteful) power consumption, as the idle, active physical servers 170 still consume a substantial amount of power (e.g., up to 50% of the power consumption of a physical server operating at peak workload).

As such, the workload prediction component 150 can determine the totality of physical servers 160 that are available within one or more data centers. The workload prediction component 150 can also determine a plurality of virtual workload deployment requests that were processed within the one or more data centers during a historical window of time. For example, the workload prediction component 150 could determine a period of time based at least in part on the amount of time required to boot an inactive physical server 180. That is, it is useful for the workload prediction component 150 to predict the future workload sufficiently far into the future, such that the inactive physical servers 180 can be brought to active status in time to meet the predicted future demand.

The workload prediction component 150 can classify each of the plurality of virtual workload deployment requests into one of a plurality of categories. Additionally, the workload prediction component 150 can generate, for each of the plurality of categories, a respective prediction model, based on the virtual workload deployment requests classified into the respective category. The workload prediction component 150 can then determine a number of physical servers to have active at a future moment in time, using the generated prediction models. Doing so provides a more accurate prediction of the physical computing resources that will be needed to meet the future workload deployment demand of the data center(s).

Figure 2:
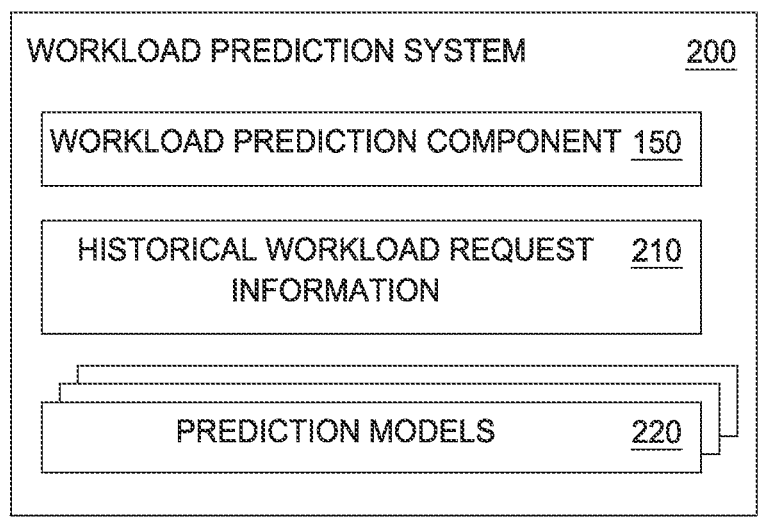
FIG. 2 is a block diagram illustrating a system containing a workload prediction component having a plurality of prediction models, according to one embodiment described herein.

FIG. 2 is a block diagram illustrating a system containing a workload prediction component having a plurality of prediction models, according to one embodiment described herein. As shown, the workload prediction system 200 includes the workload prediction component 150, historical workload request information 210 and prediction models 220. The historical workload request information 210 describes workload deployment requests that have been received by a computing cluster (e.g., one or more data centers, a cloud computing environment, etc.). For instance, the historical workload information 210 could specify all of the deployment requests that were processed by the virtual workload management component 110 within a particular window of time. As an example, the historical workload information 210 could include all of the historical traces of VM deployment requests that were submitted to the computing cluster by clients within a window of time (e.g., one day).

Additionally, the historical workload information 210 can specify various computing resources that were requested in each of the deployment requests. For example, one deployment request could request 2 units of CPU (e.g., 2 CPUs of a particular type), 16 gigabytes of memory and 1 gigabit per second of network bandwidth, while another deployment request could request 1 unit of CPU, 8 gigabytes of memory and 100 megabits of network bandwidth. Of course, these examples are provided for illustrative purposes only and without limitation, and more generally, any number and type of computing resources can be specified within deployment requests, consistent with the functionality described herein.

Generally, the workload prediction component 150 can be configured to generate the prediction models 220 based on the historical workload request information 210, and the workload prediction component 150 can then use the generated prediction models 220 to predict the future demand for deploying virtual workloads within the computing cluster. In doing so, the workload prediction component 150 could determine a number of categories for use in classifying the deployment requests in the historical workload request information 210. For instance, the workload prediction component 150 could determine an optimal number of categories and could classify each of the deployment requests in the historical workload request information 210 into one of the determined categories.

As an example, the workload prediction component 150 could classify the deployment requests based on the computing resources (e.g., CPU, memory, bandwidth, etc.) requested by the respective request. For instance, assume that d represents the number of resources associated with each request. In one embodiment, the workload prediction component 150 could measure the similarity amongst the requests in terms of requested resources by representing each of the deployment requests as a point within a d-dimensional space, where each dimension corresponds to a respective computing resource and where the coordinates of the point represent the amount of resources that were requested for the VM request on each dimension. The workload prediction component 150 could then classify the plotted points into various categories, using the Euclidean distances to measure dissimilarity (in terms of resource requirements) the between the various points.

In one embodiment, the workload prediction component 150 is configured to use the k-Means clustering technique to group the plotted points. For instance, assume that k represents the number of categories. The workload prediction component 150 could take the value k as input to the k-Means clustering technique and could determine k clusters of points (i.e., where each cluster represents a category of deployment requests), where each cluster has certain resource requirements and is represented by a center point within the d-dimensional space. Upon receiving the value k as input, the workload prediction component 150 could select k points (e.g., using a random or pseudo-random selection algorithm) to be the centers of the k categories. The workload prediction component 150 could then assign each point to its nearest center (e.g., based on measures of Euclidean distance between the point and the various centers). After assigning each point to a center, the workload prediction component 150 could update the centers of the cluster, based on a center of gravity for the group of points assigned to each respective cluster. The workload prediction component 150 could then repeat assigning points and updating the centers of the clusters, and could do so until performing further updates would not change the centers of the clusters.

The workload prediction component 150 can use a number of various techniques in determining the optimal number of categories (i.e., the optimal value k). In one embodiment, the workload prediction component 150 is configured to perform the k-Means algorithm for different values of k, calculating the k centers each time, and measuring the categorization error each time. The workload prediction component 150 could then select an optimal value k based on the measures of categorization error. For example, the workload prediction component 150 could calculate the categorization error as the Sum of the Squared Distances (SSD), which represents the error when representing each request by its category center. For instance, the SSD could be calculated using Equation 1, shown below, where k is the number of categories, $C_i$ represents the set of all deployment requests belonging to the $i^{th}$ category, and distance(r, $c_i$) is the Euclidean distance between a request r in the historical deployment requests and $c_i$ which is the center of the $i^{th}$ category:

Categorization Error Based on the
Sum of Squared Distances $$SSD(k) = \sum_{i=1}^{k} \sum_{r \in C_i} [\text{distance}(r, c_i)]^2 \qquad \text{Equation 1}$$

Generally, as the number of categories k increases, the categorization error decreases. However, as the number of categories k grows, the computational overhead of the workload prediction component 150 in predicting the future workload of the computing cluster may increase as well (e.g., as the workload prediction component 150 could use a separate prediction model for each category, which requires additional training and additional processing resources to perform predictions). Thus, in one embodiment, the workload prediction component 150 can select the optimal value k by plotting the categorization error measures and selecting the value of k based on the resulting graph. For instance, the workload prediction component 150 could determine a point at which increasing the value of k further would produce negligible reduction in categorization error (e.g., an elbow value of the resulting graph).

Once the number of categories and the characteristics of each category are determined, the workload prediction component 150 can generate the prediction models 220 based on the resulting categories. For example, the workload prediction component 150 could generate a respective neural network prediction model 220 for each of the k categories. In such an example, each prediction model 220 is configured to predict a number of deployment requests belonging to the corresponding category will be received at a future moment in time. The workload prediction component 150 could then determine a number of physical servers that would be required to fulfill the deployment requests predicted by each of the prediction models 220. Moreover, the workload prediction component 150 could schedule for the determined number of physical servers to be active (i.e., available for instantiating one or more virtual workloads to fulfill a deployment request) within the computing cluster, at the future moment in time.

While the prediction models 220 can generally be configured to make predictions at any amount of time in the future, the workload prediction component 150 can be configured to determine an optimal window of time in generating the prediction models 220. In one embodiment, the workload prediction component 150 can analyze the power attributes of the physical servers in the computing cluster in order to determine the length of the prediction window. Such attributes may include, for example, the power consumed by a server within the cluster when the server is ON and idle ($P_{idle}$), the power consumed by a server in a sleep state ($P_{sleep}$), the power consumed when transitioning from the ON state to the sleep state ($E_{on\_sleep}$), the power consumed when transitioning from the sleep state to the ON state ($E_{sleep\_on}$), the amount of time to transition from the ON state to the sleep state ($T_{on\_sleep}$) and the amount of time to transition from the sleep state to the ON state ($T_{sleep\_on}$). For example, the workload prediction component 150 could calculate the length of the prediction window by first determining the break-even time for each server ($T_{be}$), which represents the length of idle time for which switching the server to sleep would consume an amount of energy that is equal to the energy consumed if the server was merely left ON and idle. That is, the power consumed by a server left server ON and idle is shown in Equation 2 below:

$$E_{idle} = P_{idle} \times T \quad \text{Equation 2—Idle Server Power Consumption}$$

Additionally, the amount of power consumed by switching the idle server to sleep for a period of time is represented in Equation 3:

$$E_{sleep} = E_{on \to sleep} + P_{sleep} \times (T - T_{on \to sleep} - T_{sleep \to on}) + E_{sleep \to on}$$
Equation 3—Power Consumption for Putting a Server into a Sleep State As such, the workload prediction component 150 can calculate the break-even time $T_{be}$ as the value of T for which $E_{idle} = E_{sleep}$, as represented in Equation 4 below:

Break-Even Time for Putting a Server into a Sleep State $$T_{be} = \frac{E_{on \to sleep} + P_{sleep}(-T_{on \to sleep} - T_{sleep \to on}) + E_{sleep \to on}}{(P_{idle} - P_{sleep})} \quad \text{Equation 4}$$

Thus, if a server remains idle for a period of time larger than $T_{be}$, then it is worth switching the server to sleep, as $E_{sleep}$ would be strictly less than $E_{idle}$ in such a circumstance. Accordingly, the workload prediction component 150 could determine the length of the prediction window for the prediction models to be greater than the value $T_{be}$, as otherwise the servers could not be switched to a sleep state in an efficient fashion. In computing clusters containing heterogeneous servers having different power attributes, the workload prediction component 150 can be configured to calculate the break-even time $T_{be}$ for each unique type of server, and the workload prediction component 150 can then determine the length of the prediction window to be greater than the largest value $T_{be}$ across all of the server types.

Figure 3:
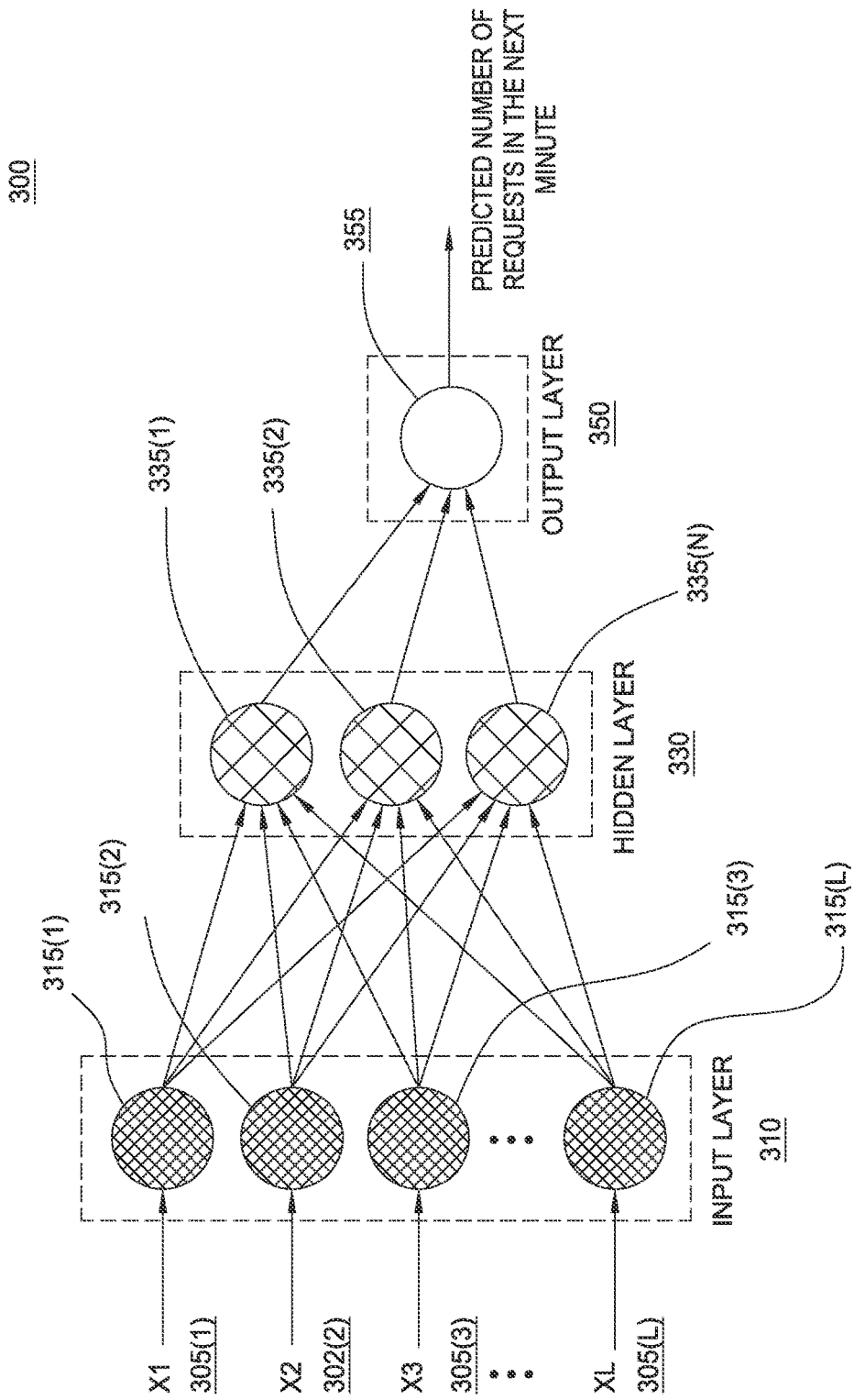
FIG. 3 is a diagram illustrating a prediction model for predicting a number of requests that will be received within a future window of time, according to one embodiment described herein.

In addition to tuning the length of the prediction window, the workload prediction component 150 can tune other parameters of the prediction models 220 to ensure accurate predictions of future workload. FIG. 3 is a diagram illustrating a prediction model used for predicting a number of requests that will be received within a future window of time, according to one embodiment described herein. As shown, the neural network prediction model 300 includes an input layer 310, a hidden layer 330 and an output layer 350. In the depicted embodiment, the workload prediction component 150 has divided the virtual workload requests classified into the category corresponding to the prediction model 300 into a number of discretized time slot groups 305(1)-(L). For example, each of the number of discretized time slot groups 305(1)-(L) could correspond to a respective minute of the observation window (i.e., the duration of time during which the requests in the historical workload request information 210 were received), where L represents the number of discretized slots.

The input layer 310 contains input neurons 315(1)-(L), each corresponding to a respective discretized time slot groups 305(1)-(L). In the depicted prediction model 300, the value n represents the time at which a prediction of future workload needs to be made. As such, the input X1 305(1) refers to the number of requests in the category that were received in the direction between minutes [n, n−1] (i.e., the minute before the current moment in time at which the prediction is being made), the input X2 refers to the number of requests received in the duration of minutes [n−1, n−2], and so on, where the input Xi refers to the number of requests in the corresponding category received between minutes [n−i, n−i+1].

The hidden layer 330 contains neurons 335(1)-(n), where each neuron 335(1)-(n) receives the output of neurons 315(1)-(L). Generally, each neuron 335(1)-(n) is configured to multiply the output of each neuron 315(1)-(L) by a certain weight, add a bias term, and apply a sigmoid activation function to the sum of the results. The neurons 335(1)-(n) then output the resulting value to the neuron 355 in the output layer 350. The neuron 355 in the output layer 350 is configured to take as input the outputs of the neurons 335(1)-(n) in the hidden layer 330, multiply each input by a weight, add a bias term to the summation result, apply a linear activation function and output the final result, representing how many requests will be received in the next unit of time (e.g., 1 minute) for the category that the predictor is dedicated for.

The workload prediction component 150 can tune the various weights used by the various neurons 315(1)-(L), 335(1)-(N) and 355 to determine optimal weight values. For instance, the workload prediction component 150 could utilize a Back Propagation algorithm to find the weight values for the various layers 310, 330 and 350 that minimize the prediction error, based on the number of requests for the corresponding category that were received during the historical traces. For instance, the workload prediction component 150 could use a Back Propagation algorithm that begins with random weights and biases. In a forward stage of such an algorithm, the workload prediction component 150 could apply to the neural network prediction model 300 the number of requests that were received for the considered category during L contiguous slots from the historical data (where L is the length of the observation window). The weights and biases generally remain the same throughout the forward stage where the output of the prediction model 300 is calculated. The workload prediction component 150 could then perform a backward stage of the Back Propagation algorithm, in which the output of the neural network prediction model 300 is compared against the actual number of requests that were received in the following slot (e.g., as obtained from the historical traces in the historical workload request information 210). The workload prediction component 150 could calculate the error between the predicted number of requests and the actual number of request, and could use the calculated error to tune the weights and biases within the neurons of the layers 310, 330, and 350. The workload prediction component 150 could then move into the next adjacent L slots in the historical traces and could repeat the forward and backwards stages to refine the weights and biases.

In one embodiment, the workload prediction component 150 is configured to determine an optimal value of L, which results in an optimal number of discretized time slots 305(1)-(L) and an optimized number of hidden neurons 335(1)-(L) in the hidden layer 330. For instance, the workload prediction component 150 could divide the historical traces within the historical workload request information 210 into a training data portion (e.g., 70% of the historical traces) and a validation data portion (e.g., the remaining 30% of the historical traces). The performance of the prediction model 300, having the optimized weights and biases discussed above, could then be tested using the validation data portion of the historical traces and the Mean-Square Error could be calculated. After evaluating different values for L, the workload prediction component 150 could select the value of L having the lowest Mean-Square Error for performing future predictions.

Figure 4:
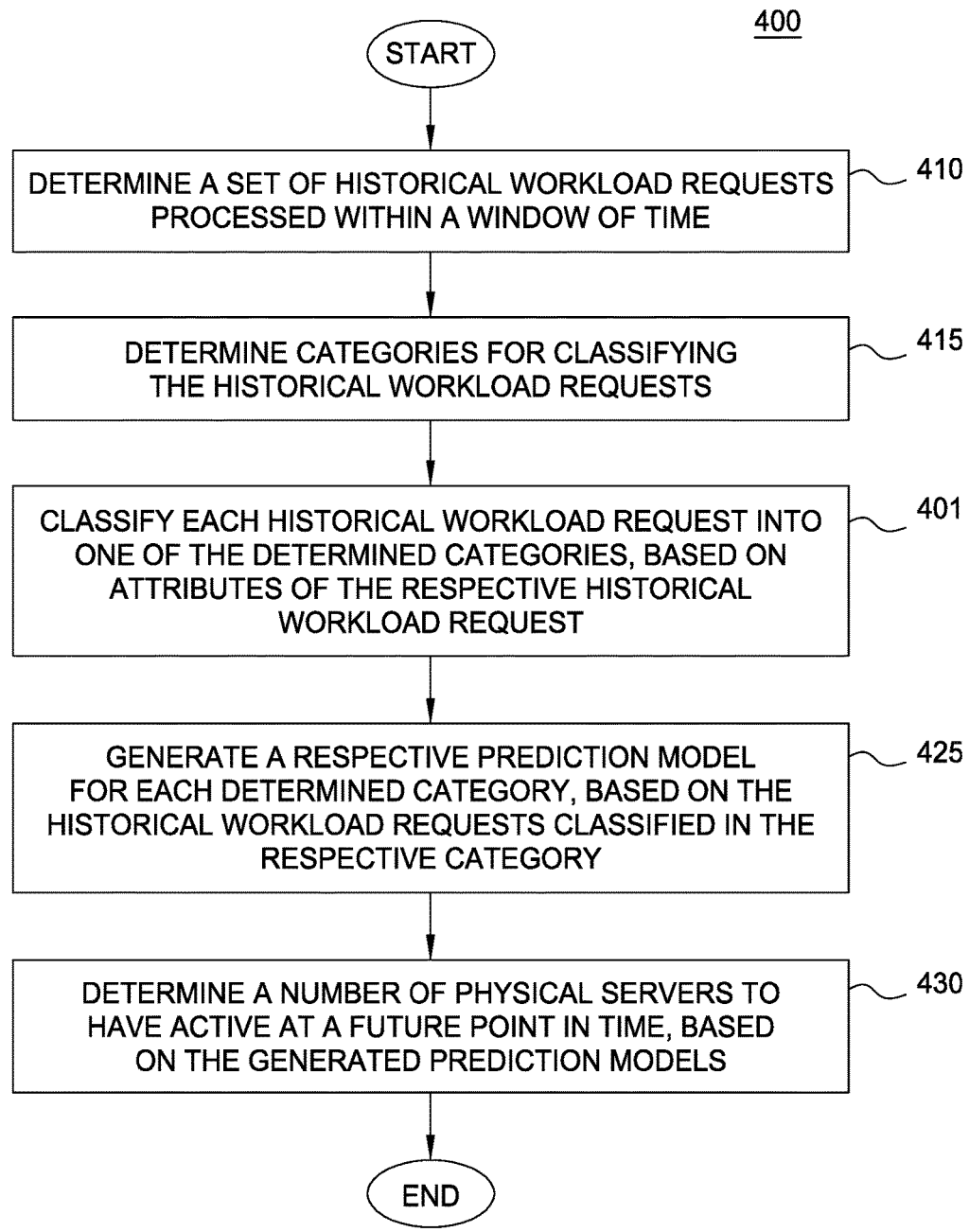
FIG. 4 is a flow diagram illustrating a method for determining a number of active physical servers that will be needed at a future moment in time, according to one embodiment described herein.

FIG. 4 is a flow diagram illustrating a method for determining a number of active physical servers that will be needed at a future moment in time, according to one embodiment described herein. As shown, the method 400 begins at block 410, where the workload prediction component 150 determines historical workload requests processed within a window of time. Generally, the workload prediction component 150 can determine the optimal length of the observation window, e.g., using the techniques discussed above.

The workload prediction component 150 additionally determines a number of categories for use in categorizing the historical workload requests (block 415). Generally, any number of techniques can be used for determining the number of categories to use to classify the historical workload requests. For example, the workload prediction component 150 could use a k-Means clustering algorithm for multiple values of k, and could select an optimal value of k based on measures of normalized categorization error for the iterations of the k-Means clustering algorithm across the multiple values of k.

The workload prediction component 150 also classifies each historical workload request into one of the determined categories, based in part on attributes of the respective historical workload request (block 420). For instance, the workload prediction component 150 could plot each historical workload request as a point in a d-dimensional space, where d represents a type of computing resources specified within the request. The workload prediction component 150 could then classify the point into the category whose center has the shortest Euclidean distance to the plotted point for the historical workload request.

Additionally, the workload prediction component 150 generates a neural network prediction model for each determined category, based on the historical workload requests classified into the respective category (block 425). For example, the workload prediction component 150 could generate the neural network prediction model 300 shown in FIG. 3, and could tune and optimize attributes of the neural network prediction model as discussed above.

The workload prediction component 150 then determines a number of physical servers to have active at a future point in time, based on the generated prediction models (block 430), and the method 400 ends. For example, the workload prediction component 150 could monitor the number of workload deployment requests that were recently received by the computing cluster. The workload prediction component 150 could additionally classify each request into one of the determined categories (e.g., the category whose center has the shortest Euclidean distance to a d-dimensional point representing the request). The workload prediction component 150 could then determine a number of requests in each of the categories during each discretized time slot (e.g., 1 minute) of the observation window.

The workload prediction component 150 could then process the requests in the discretized time slots for each of the categories, as input to the respective trained prediction model. By doing so, the workload prediction component 150 can determine a predicted number of requests that will be received for each of the categories at a future point in time. The workload prediction component 150 could use such a value to predict the number of physical servers to have active at the future point in time. That is, the workload prediction component 150 could determine a number of physical servers that would be needed to fulfill the predicted number of requests for each of the categories, based on the respective measure of computational resources corresponding to each of the categories.

Figure 5:
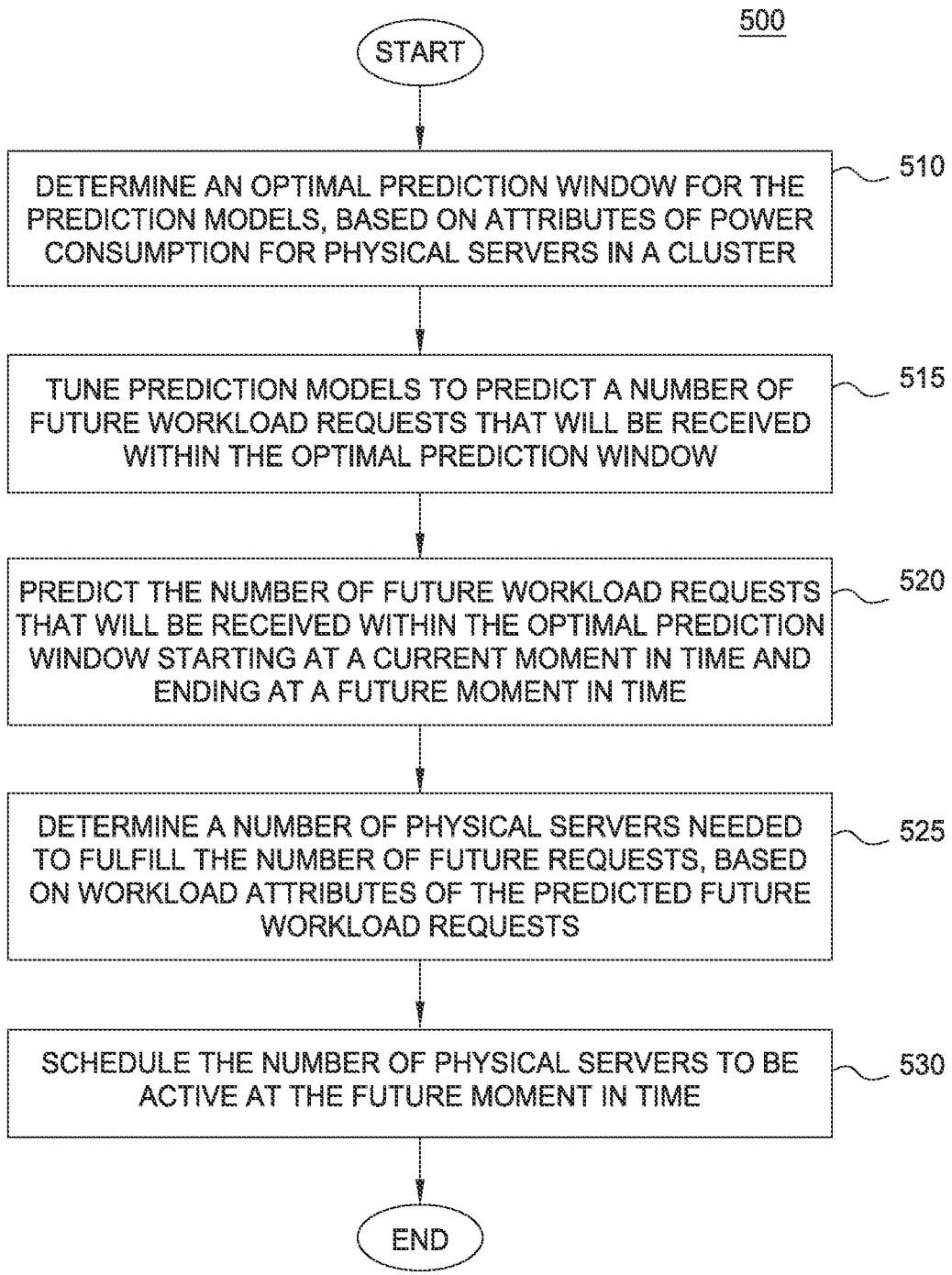
FIG. 5 is a block diagram illustrating a method for scheduling a number of physical servers to be active at a future moment in time, according to one embodiment described herein.

FIG. 5 is a block diagram illustrating a method for scheduling a number of physical servers to be active at a future moment in time, according to one embodiment described herein. As shown, the method 500 begins at block 510, where the workload prediction component 150 determines an optimal prediction window for the prediction models, based on attributes of power consumption for the physical servers in a computing cluster. For example, the workload prediction component 150 could determine the length of the prediction window to be at least the value $T_{be}$, to ensure that servers can be switched to and from a sleep state in an efficient fashion.

The workload prediction component 150 tunes the prediction models to predict a number of future workload requests that will be received within the determined optimal prediction window (block 515). For instance, the workload prediction component 150 could use a Back Propagation algorithm to find optimal values for the weights and biases within the layers 310, 330 and 350 of the prediction model 300.

The workload prediction component 150 also predicts the number of future workload requests that will be received within the optimal prediction window, starting at a current moment in time and ending at a future moment in time (block 520). For example, the workload prediction component 150 could monitor the number of workload deployment requests that were recently received by the computing cluster and could additionally classify each request into one of the determined categories. The workload prediction component 150 could then determine a number of requests in each of the categories during each discretized time slot of the observation window and could process the requests in the discretized time slots for each of the categories, as input to the respective trained prediction model. By doing so, the workload prediction component 150 can determine a predicted number of requests that will be received for each of the categories at a future point in time.

In the method 500, the workload prediction component 150 next determines a number of physical servers needed to fulfill the number of future requests, based on workload attributes of the predicted future workload requests (block 525). For instance, the workload prediction component 150 could determine a number of physical servers that would be needed to fulfill the predicted number of requests for each of the categories, based on the respective measure of computational resources corresponding to each of the categories. As an example, the workload prediction component 150 could use the center point of each of the categories in the d-dimensional space to determine the approximate amount of computational resources that will be requested for each request classified into the category (i.e., based on the coordinates of the center point in the d-dimensional space).

The workload prediction component 150 then schedules the number of physical servers to be active at the future moment in time (block 530), and the method 500 ends. Doing so provides an accurate and optimized prediction algorithm for scheduling the availability of computing resources in the cluster computing environment, thereby reducing power consumption while minimizing the delay in processing client requests.

Figure 6:
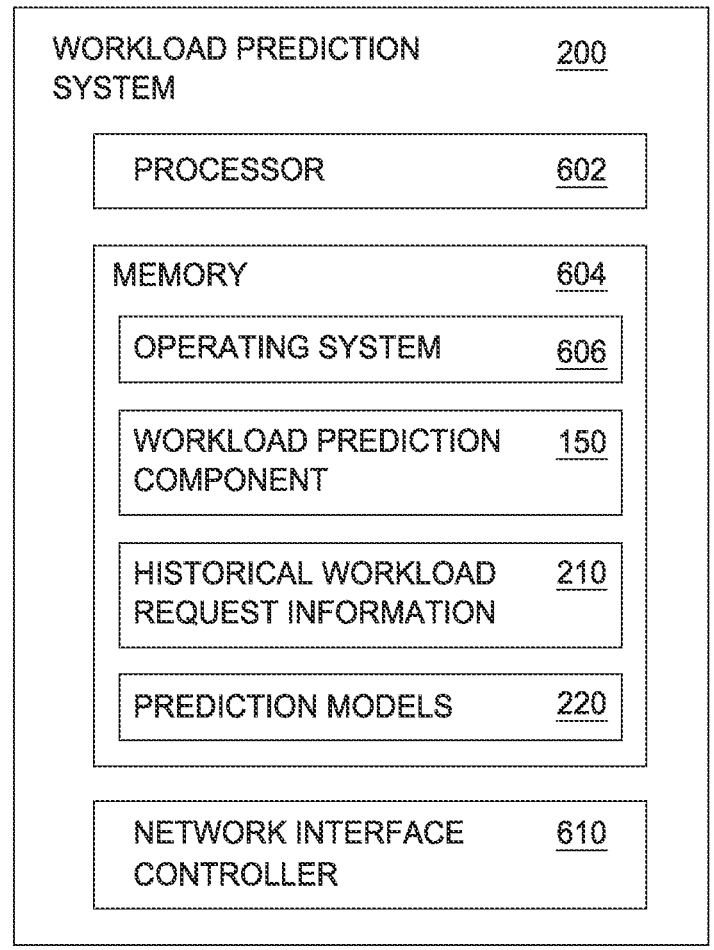
FIG. 6 is a block diagram illustrating a system containing a workload prediction component, according to one embodiment described herein.

FIG. 6 is a block diagram illustrating a system containing a workload prediction component, according to one embodiment described herein. The workload prediction system 200 shown in FIG. 6 contains one or more computer processors 602. The processor(s) may be any processing element capable of performing the functions described herein, and such a processor can represents single processor, multiple processors, a processor with multiple cores, and combinations thereof.

The workload prediction system 200 additionally includes a memory 604. The memory 604 may be either volatile or non-volatile memory and include, RAM, flash, cache, disk drives and the like. Although shown as a single entity, the memory 604 may be divided into different memory storage elements such as RAM and one or more hard disk drives. In one embodiment, the memory 604 comprises one or more static random access memory (SRAM) modules.

The memory generally includes an operating system 606, the workload prediction component 150, historical workload request information 210 and prediction models 220. The historical workload request information 210 describes workload deployment requests that have been received by a computing cluster (e.g., one or more data centers, a cloud computing environment, etc.). Generally, the workload prediction component 150 can be configured to generate the neural network prediction models 220 based on the historical workload request information 210, and the workload prediction component 150 can then use the generated neural network prediction models 220 to predict the future demand for deploying virtual workloads within the computing cluster. In doing so, the workload prediction component 150 could determine a number of categories for use in classifying the deployment requests in the historical workload request information 210. For instance, the workload prediction component 150 could determine an optimal number of categories and could classify each of the deployment requests in the historical workload request information 210 into one of the determined categories. By doing so, the workload prediction component 150 can accurately schedule the availability of computing resources in the computing environment at future points in time based on a predicted future workload of the computing environment, thereby reducing power consumption while minimizing the delay in processing client requests.

In the preceding, reference is made to embodiments presented in this disclosure. However, the scope of the present disclosure is not limited to specific described embodiments. Instead, any combination of the described features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the preceding aspects, features, embodiments and advantages are merely illustrative and are not considered elements or limitations of the appended claims except where explicitly recited in a claim(s).

As will be appreciated by one skilled in the art, the embodiments disclosed herein may be embodied as a system, method or computer program product. Accordingly, aspects may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium is any tangible medium that can contain, or store a program for use by or in connection with an instruction execution system, apparatus or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality and operation of possible implementations of systems, methods and computer program products according to various embodiments. In this regard, each block in the flowchart or block diagrams may represent a module, segment or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In view of the foregoing, the scope of the present disclosure is determined by the claims that follow.

We claim:

1. A computer-implemented method, comprising:
   determining a plurality of virtual workload deployment requests that were processed within one or more data centers during a historical window of time, the one or more data centers having a plurality of physical servers;
   classifying each of the plurality of virtual workload deployment requests into one of a plurality of categories;
   generating, for each of the plurality of categories and by operation of one or more computer processors, a respective neural network prediction model, based on the virtual workload deployment requests classified into the respective category, comprising, for each of the plurality of categories:
      determining a number of input neurons of the neural network prediction mode, where the number of input neurons is determined based on recent workload variations to be considered in accurately predicting future virtual workload deployment demands of the one or more data centers;
      determining a number of hidden neurons to include within the neural network prediction model for each of the plurality of categories;
      separating the plurality of virtual workload deployment requests classified into the respective category into a plurality of discretized time slots; and
      processing virtual workload deployment requests in each of the plurality of discretized time slots using a respective one of a plurality of input neurons of a neural network; and
   determining a number of physical servers of the plurality of physical servers to have active at a future moment in time, based on a predicted number of virtual workload deployment requests calculated for each of the plurality of categories using the generated neural network prediction models.

2. The computer-implemented method of claim 1, wherein classifying each of the plurality of virtual workload deployment requests into one of the plurality of categories further comprises:
   determining the plurality of categories, based on attributes of the plurality of virtual workload deployment requests.

3. The computer-implemented method of claim 2, wherein determining the plurality of categories further comprises:
   plotting each of the plurality of virtual workload deployment requests as a respective one of a plurality of points in a d-dimensional space, based on an amount of computing resources requested in the respective virtual workload deployment request;
   determining Euclidean distances between the plotted points in the d-dimensional space; and
   clustering the plotted points in the d-dimensional space based on the determined Euclidean distances.

4. The computer-implemented method of claim 3, wherein determining the plurality of categories further comprises:
   for each of a plurality of values k:
      selecting k virtual workload deployment requests from the plurality of virtual workload deployment requests to be a center of each of k categories;
      assigning each remaining virtual workload deployment request in the plurality of virtual workload deployment requests to a respective one of the k categories, based on a similarity of the respective virtual workload deployment request to the center of the respective category; and
      updating the center of each of the k categories, based on a center of gravity of all virtual workload deployment requests assigned to the respective category;
   determining a respective measure of categorization error for each of the plurality of values k; and
   determining an optimal number of categories, based on the respective measures of categorization error.

5. The computer-implemented method of claim 3, wherein each of the plurality of virtual workload deployment requests specifies d types of requested computing resources.

6. The computer-implemented method of claim 5, wherein the requested computing resources include a measure of CPU processing capacity, a measure of available system memory and a measure of network bandwidth.

7. The computer-implemented method of claim 1, wherein each of the plurality of virtual workload deployment requests specifies a respective one or more virtual machine images to be deployed within the one or more data centers.

8. The computer-implemented method of claim 7, wherein each of the plurality of virtual workload deployment requests further specifies at least one of (i) a load balancing component, (ii) a firewall, (iii) a virtual host, and (iv) Multiprotocol Label Switching (MPLS) Virtual Private Network (VPN) services.

9. The computer-implemented method of claim 1, further comprising:
   determining the future moment in time, based on attributes of power consumption for physical servers having differing power specifications in the one or more data centers.

10. The computer-implemented method of claim 9, wherein a duration between a current moment in time and the future moment in time is determined as a value that is greater than a value $T_{be}$, and wherein $T_{be}$ is determined according to the following equation:

$$T_{be} = \frac{E_{on \rightarrow sleep} + P_{sleep}(-T_{on \rightarrow sleep} - T_{sleep \rightarrow on}) + E_{sleep \rightarrow on}}{(P_{idle} - P_{sleep})}.$$

11. The computer-implemented method of claim 1, further comprising:
   calculating, for each of the plurality of categories, the predicted number of virtual workload deployment requests that will be received at the future moment in time, based on output of the plurality of input neurons of the neural network prediction model.

12. The computer-implemented method of claim 11, wherein determining the number of physical servers to have active at the future moment in time is further based on a determined count of physical servers required to instantiate of the predicted number of virtual workload deployment requests for each of the plurality of categories.

13. The computer-implemented method of claim 1, further comprising:
   determining a proper subset of the plurality of physical servers available within one or more data centers to place into an active state at the future moment in time, that is equal in size to the determined number of physical servers; and
   scheduling for the proper subset of physical servers to be active within the one or more data centers at the future moment in time.

14. A system, comprising:
   one or more computer processors; and
   a memory containing a program that, when executed by the one or more computer processors, performs an operation comprising:
      determining a plurality of virtual workload deployment requests that were processed within one or more data centers during a historical window of time, the one or more data centers having a plurality of physical servers;
      classifying each of the plurality of virtual workload deployment requests into one of a plurality of categories;
      generating, for each of the plurality of categories, a respective neural network prediction model, based on the virtual workload deployment requests classified into the respective category, comprising, for each of the plurality of categories:
         determining a number of input neurons of the neural network prediction mode, where the number of input neurons is determined based on recent workload variations to be considered in accurately predicting future virtual workload deployment demands of the one or more data centers;
         determining a number of hidden neurons to include within the neural network prediction model for each of the plurality of categories; and
         separating the plurality of virtual workload deployment requests classified into the respective category into a plurality of discretized time slots; and
         processing virtual workload deployment requests in each of the plurality of discretized time slots using a respective one of a plurality of input neurons of a neural network; and
      determining a number of physical servers of the plurality of physical servers to have active at a future moment in time, based on a predicted number of virtual workload deployment requests calculated for each of the plurality of categories using the generated neural network prediction models.

15. The system of claim 14, wherein classifying each of the plurality of virtual workload deployment requests into one of the plurality of categories further comprises:
   determining the plurality of categories, based on attributes of the plurality of virtual workload deployment requests, comprising:
      plotting each of the plurality of virtual workload deployment requests as a respective one of a plurality of points in a d-dimensional space, based on an amount of computing resources requested in the respective virtual workload deployment request;
      determining Euclidean distances between the plotted points in the d-dimensional space; and
      clustering the plotted points in the d-dimensional space based on the determined Euclidean distances.

16. The system of claim 15, wherein determining the plurality of categories further comprises:
   for each of a plurality of values k:
      selecting k virtual workload deployment requests from the plurality of virtual workload deployment requests to be a center of each of k categories;
      assigning each remaining virtual workload deployment request in the plurality of virtual workload deployment requests to a respective one of the k categories, based on a similarity of the respective virtual workload deployment request to the center of the respective category; and
      updating the center of each of the k categories, based on a center of gravity of all virtual workload deployment requests assigned to the respective category;
   determining a respective measure of categorization error for each of the plurality of values k; and
   determining an optimal number of categories, based on the respective measures of categorization error.

17. A non-transitory computer-readable medium containing computer program code executable to perform an operation comprising:
- determining a plurality of virtual workload deployment requests that were processed within one or more data centers during a historical window of time, the one or more data centers having a plurality of physical servers;
- classifying each of the plurality of virtual workload deployment requests into one of a plurality of categories;
- generating, for each of the plurality of categories and by operation of one or more computer processors when executing the computer program code, a respective neural network prediction model, based on the virtual workload deployment requests classified into the respective category, comprising, for each of the plurality of categories:
  - determining a number of input neurons of the neural network prediction mode, where the number of input neurons is determined based on recent workload variations to be considered in accurately predicting future virtual workload deployment demands of the one or more data centers;
  - determining a number of hidden neurons to include within the neural network prediction model for each of the plurality of categories; and
  - separating the plurality of virtual workload deployment requests classified into the respective category into a plurality of discretized time slots; and
  - processing virtual workload deployment requests in each of the plurality of discretized time slots using a respective one of a plurality of input neurons of a neural network; and
- determining a number of physical servers of the plurality of physical servers to have active at a future moment in time, based on a predicted number of virtual workload deployment requests calculated for each of the plurality of categories using the generated neural network prediction models.

18. The system of claim 14, wherein each of the plurality of virtual workload deployment requests specifies d types of requested computing resources.

19. The system of claim 16, wherein the requested computing resources include a measure of CPU processing capacity, a measure of available system memory and a measure of network bandwidth.

* * * * *

UNITED STATES PATENT AND TRADEMARK OFFICE
CERTIFICATE OF CORRECTION

PATENT NO.       : 10,084,658 B2
APPLICATION NO.  : 14/868224
DATED            : September 25, 2018
INVENTOR(S)      : Mehiar Dabbagh et al.

Page 1 of 1

It is certified that error appears in the above-identified patent and that said Letters Patent is hereby corrected as shown below:

In the Specification

In Column 9, Line 27-28, delete "Equation $E_{sleep} = E_{on \rightarrow sleep} + P_{sleep} \times (T - T_{on \rightarrow sleep} - T_{sleep \rightarrow on}) + E_{sleep \rightarrow on}$ — Power Consumption for Putting a Server into a Sleep State," and insert -- Equation 3 -- Power Consumption for Putting a Server into a Sleep State $E_{sleep} = E_{on \rightarrow sleep} + P_{sleep} \times (T - T_{on \rightarrow sleep} - T_{sleep \rightarrow on}) + E_{sleep \rightarrow on}$ --, therefor.

In the Claims

In Column 20, Line 16, in Claim 18, delete "claim 14," and insert -- claim 15, -- therefor.

In Column 20, Line 20, in Claim 19, delete "claim 16," and insert -- claim 18, -- therefor.

Signed and Sealed this
Twenty-fifth Day of December, 2018

Andrei Iancu
*Director of the United States Patent and Trademark Office*